(12) United States Patent
Shiono et al.

(10) Patent No.: US 11,391,908 B2
(45) Date of Patent: Jul. 19, 2022

(54) LENS BARREL AND IMAGE PICKUP APPARATUS

(71) Applicant: CANON KABUSHIKI KAISHA, Tokyo (JP)

(72) Inventors: Masato Shiono, Hadano (JP); Keita Iwai, Kawasaki (JP); Kanae Nakamori, Kawasaki (JP); Kohei Uemura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 94 days.

(21) Appl. No.: 16/796,695

(22) Filed: Feb. 20, 2020

(65) Prior Publication Data

US 2020/0285019 A1 Sep. 10, 2020

(30) Foreign Application Priority Data

Mar. 7, 2019 (JP) .............................. JP2019-041913

(51) Int. Cl.
*G02B 15/14* (2006.01)
*G02B 7/04* (2021.01)
*H02N 2/02* (2006.01)
*G02B 27/64* (2006.01)

(52) U.S. Cl.
CPC ............. *G02B 7/04* (2013.01); *G02B 15/146* (2019.08); *G02B 27/646* (2013.01); *H02N 2/02* (2013.01)

(58) Field of Classification Search
CPC .......... G02B 7/04; G02B 7/09; G02B 15/146; G02B 27/646; G03B 13/36; G03B 17/14; H02N 2/02; H02N 2/026
USPC ................................................... 359/822–830
See application file for complete search history.

(56) References Cited

U.S. PATENT DOCUMENTS

| 8,643,956 B2* | 2/2014 | Nakagawa | G02B 7/102 359/697 |
|---|---|---|---|
| 2013/0044381 A1* | 2/2013 | Ito | G02B 7/102 359/823 |
| 2013/0070150 A1* | 3/2013 | Yumiki | G02B 7/102 348/360 |
| 2016/0103297 A1* | 4/2016 | Kobayashi | G02B 7/08 359/824 |
| 2018/0231734 A1* | 8/2018 | Ochi | G02B 7/021 |

FOREIGN PATENT DOCUMENTS

| CN | 1702486 A | 11/2005 |
| JP | 2013179787 A | 9/2013 |
| JP | 2013179787 A * | 9/2013 |

* cited by examiner

*Primary Examiner* — Mahidere S Sahle
(74) *Attorney, Agent, or Firm* — Canon U.S.A., Inc. IP Division

(57) ABSTRACT

A lens barrel according to the present disclosure includes a booster transformer that is arranged on an inner circumference side of a cam barrel and constitutes a power supply for an actuator. The booster transformer is arranged on a side surface of a barrel. The booster transformer is configured to move in an optical axis direction together with the barrel in accordance with rotation of the cam barrel.

7 Claims, 12 Drawing Sheets

LENS BARREL AND IMAGE PICKUP APPARATUS

BACKGROUND OF THE DISCLOSURE

Field of the Disclosure

The present disclosure relates to a lens barrel having a circuit component that constitutes a power supply within a barrel. Specifically, the present disclosure relates to a lens barrel applied to an image pickup apparatus such as a digital still camera and a digital video camera

Description of the Related Art

An ultrasonic wave motor may be mounted on an optical device such as a digital camera, a video camera, and an exchangeable lens to increase speed of an autofocus function and achieve quiet performance.

A power supply for driving the ultrasonic wave motor requires a circuit component (hereinafter referred to as a booster transformer) that boosts a voltage supplied thereto and that applies a desired alternating voltage to the ultrasonic wave motor.

Meanwhile, leakage magnetic flux from the booster transformer becomes a cause of magnetic noise. Magnetic noise may be superimposed on image pickup signals and thus degrade image quality.

Thus, for such an optical device, reduction of magnetic noise is required to increase sensitivity and achieve higher image quality of an image pickup device mounted on the optical device.

Japanese Patent Application Laid-Open No. 2013-179787 discusses a driving device in which a booster unit is arranged at a position different from a position of a holding substrate, on which a control unit and a switching unit are mounted, to bring the booster unit close to a vibration actuator.

This configuration can shorten wiring for high voltage driving signals flowing between the booster unit and the vibration actuator and thus can curb the influence of leakage magnetic flux.

However, in the configuration discussed in Japanese Patent Application Laid-Open No. 2013-179787, the booster transformer required as the power supply for driving the vibration actuator is arranged outside a cam barrel, which is a driven member.

The booster transformer typically has a magnetic circuit such as a coil therein and has a relatively large outer shape as a circuit component. Thus, arranging the booster transformer outside the cam barrel may upsize the optical device.

SUMMARY OF THE DISCLOSURE

The present disclosure is directed to providing a lens barrel, in which a circuit component constituting a power supply can be arranged on a side surface of the lens barrel that moves in accordance with rotation of a cam barrel.

According to an aspect of the present disclosure, a lens barrel includes an image pickup optical system configured to form an object image on an image pickup device, a cam barrel configured to rotate around an optical axis of the image pickup optical system for driving a first lens that constitutes the image pickup optical system, a barrel that is configured to hold the first lens and to be cam-engaged with the cam barrel and that is arranged on an inner circumference side of the cam barrel, and a circuit component that is arranged on the inner circumference side of the cam barrel and constitutes a power supply for an actuator. The circuit component is arranged on a side surface of the barrel. The circuit component is configured to move in a direction of the optical axis together with the barrel in accordance with the rotation of the cam barrel.

Further features and aspects of the present disclosure will become apparent from the following description of example embodiments with reference to the attached drawings.

DESCRIPTION OF THE EMBODIMENTS

Figure 1:
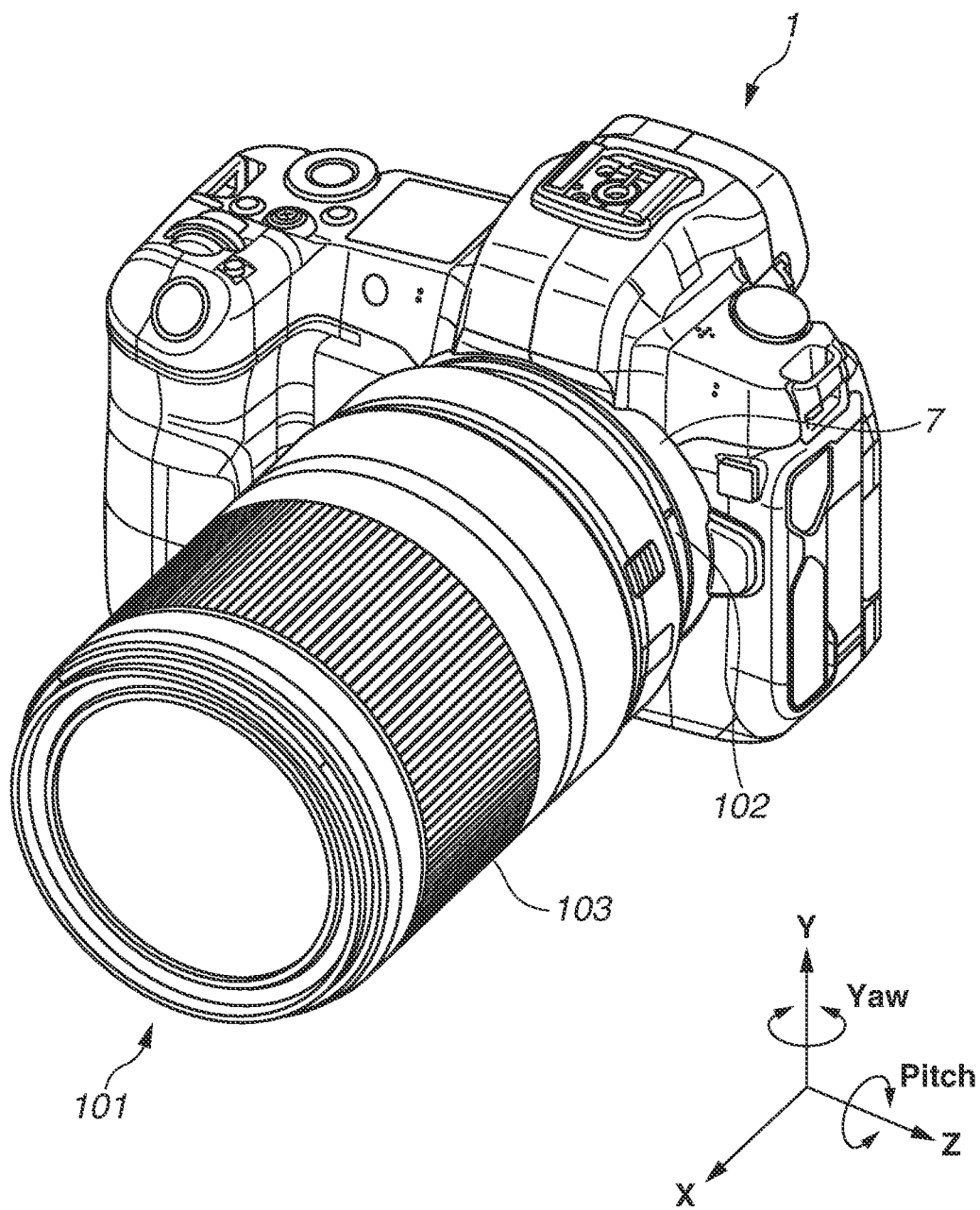
FIG. 1 is a perspective view illustrating an exchangeable lens and a digital camera according to an example embodiment of the present disclosure.

The following describes example embodiments, features and aspects thereof the present disclosure with reference to the attached drawings. The same reference numeral indicates the same part or a corresponding part throughout the drawings.

The present disclosure is not limited to a configuration of the present example embodiment and various modifications and changes can be made without departing from the gist of the present disclosure.

FIG. 1 is a perspective view illustrating appearances of an exchangeable lens (lens barrel or optical device) 101 and a digital camera (hereinafter referred to as camera body) 1, to which the exchangeable lens 101 is detachably attached, according to the example embodiment of the present disclosure.

A mount portion (hereinafter referred to as lens mount) 102 on the lens side and a mount portion (hereinafter referred to as camera mount) 7 on the camera side each have an engaging claw so that the mount portion of the exchangeable lens 101 and the mount portion of the camera body 1 can be fitted to each other.

As illustrated in FIG. 1, an optical axis direction in which an optical axis of an image pick-up optical system housed in the exchangeable lens 101 extends is referred to as an X-axis direction, and directions orthogonal to the X-axis direction are referred to as a Z-axis direction (horizontal direction) and a Y-axis direction (vertical direction).

The Z-axis direction and the Y-axis direction are collectively referred to as a Z/Y axis direction hereinbelow.

A rotational direction around the Z-axis direction is referred to as a pitch direction, and a rotational direction around the Y-axis direction is referred to as a yaw direction. The pitch direction and the yaw direction (hereinafter collectively referred to as pitch/yaw direction) are biaxial rotational directions around the Z-axis direction and the Y-axis direction that are orthogonal to each other.

The camera body 1 includes an image pickup device 16 that photoelectrically converts (captures) an object image formed by an image pickup optical system in the exchangeable lens 101.

The exchangeable lens 101 is mechanically and electrically connected to the camera mount 7 provided in the camera body 1 through the lens mount 102.

The exchangeable lens 101 as the lens barrel houses the image pickup optical system that forms the object image by focusing light from the object.

A zoom operation ring 103 that is rotatable around the optical axis by a user's operation is provided along an outer circumference of the exchangeable lens 101 as the lens barrel.

When the zoom operation ring 103 is rotated by the user, a zoom group constituting the image pickup optical system is moved to a predetermined optical position corresponding to an angle of the zoom operation ring 103. In this manner, the user can capture an image at a desired angle of view.

Figure 2:
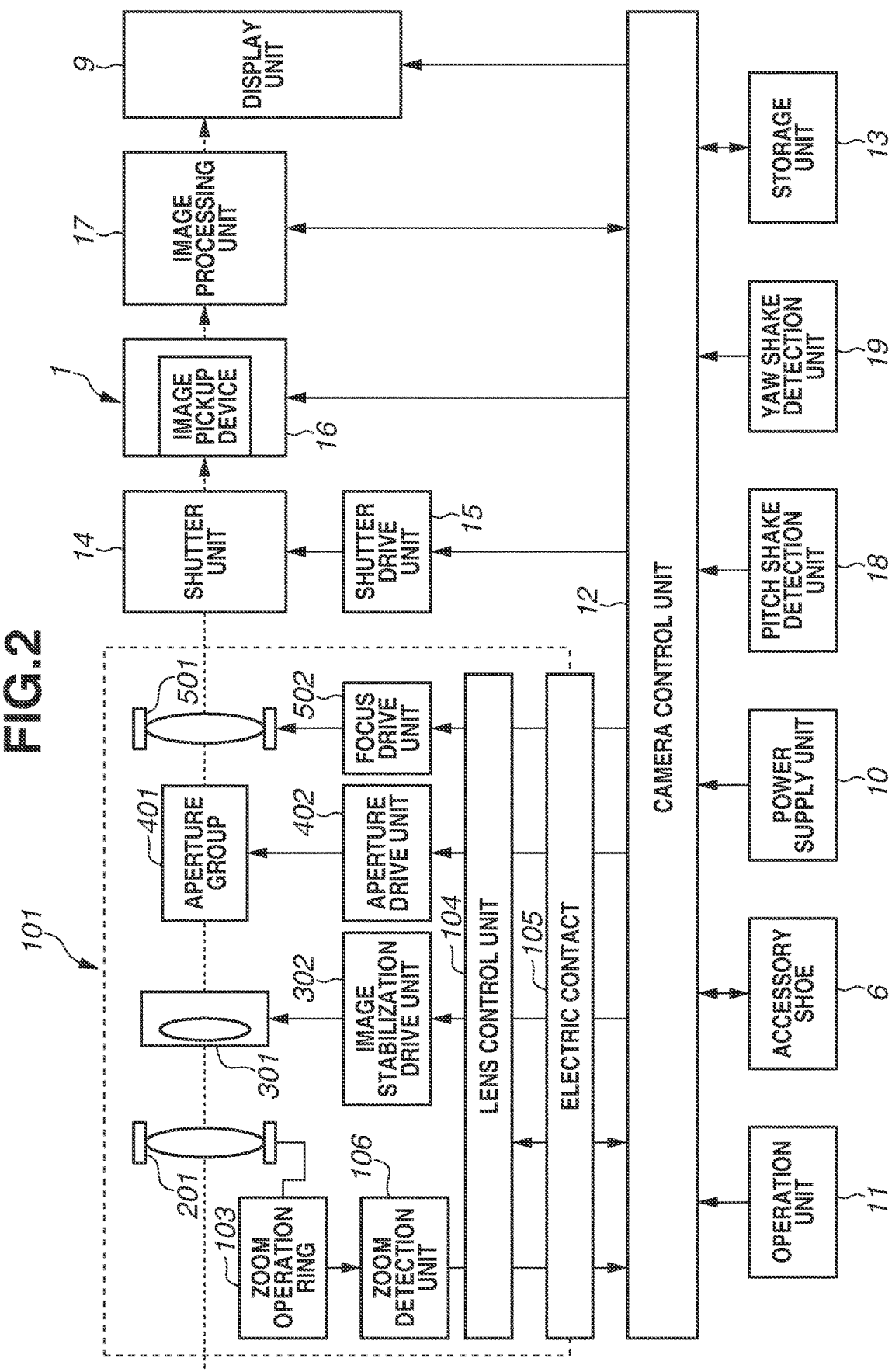
FIG. 2 is a block diagram illustrating a configuration of the exchangeable lens and the digital camera according to the example embodiment.

FIG. 2 is a block diagram illustrating an electrical and optical configuration of the exchangeable lens 101 and the camera body 1.

Control of the whole system of the camera body 1 and the exchangeable lens 101 is performed by mutual coordination between a camera control unit 12 provided in the camera body 1 and a lens control unit 104 provided in the exchangeable lens 101.

The camera control unit 12 reads out and executes a computer program stored in a storage unit 13.

At this time, the camera control unit 12 communicates with the lens control unit 104 to exchange various control signals and data through an electric contact 105 provided in the lens mount 102. The electric contact 105 includes a power supply terminal that supplies power from a power supply unit 10 to the exchangeable lens 101.

The image pickup optical system included in the exchangeable lens 101 includes: a zoom group 201 that is connected to the zoom operation ring 103 and that moves in the optical axis direction to change an angle of view; and an image stabilization lens group 301 including a shift lens as an image stabilization device that suppresses image blurring.

The image stabilization lens group 301 performs an image stabilization operation to reduce the image blurring by shifting the shift lens in the Z/Y axis direction orthogonal to the optical axis.

The image pickup optical system includes: an aperture group 401 that performs light amount adjustment; and a focus group 501 including a focus lens that performs focus adjustment by moving in the optical axis direction.

Further, the exchangeable lens 101 includes: an image stabilization drive unit 302 that drives the image stabilization lens group 301 to shift the shift lens; an aperture drive unit 402 that drives the aperture group 401; and a focus drive unit 502 that drives the focus group 501 to move the focus lens.

The camera body 1 includes a shutter unit 14, a shutter drive unit 15, the image pickup device 16, an image processing unit 17, and the camera control unit 12 described above.

The shutter unit 14 controls an amount of light that is collected by the image pickup optical system in the exchangeable lens 101 and to which the image pickup device 16 is exposed.

The image pickup device 16 photoelectrically converts the object image formed by the image pickup optical system to output image pickup signals. The image processing unit 17 performs a variety of image processing on the image pickup signals, and then generates image signals.

A display unit 9 displays the image signals (live view) output from the image processing unit 17, displays imaging parameters described above, and reproduces and displays a pick-up image recorded in the storage unit 13 or a recording medium which is not illustrated.

The camera control unit 12 controls diving of the aperture group 401 and the shutter unit 14, in accordance with an aperture value and a setting value of shutter speed received from an operation unit 11 via the aperture drive unit 402 and the shutter drive unit 15.

The camera control unit 12 controls driving of the focus group 501 in accordance with an image pickup preparatory operation (half-pressing operation) performed on the operation unit 11 (release button 5).

For example, in response to an instruction for an autofocus operation, the camera control unit 12 compares a focus state of the object image and a current position of the focus group 501 to calculate a focus drive amount based on a defocus amount, and transmits the focus drive amount to the lens control unit 104.

The lens control unit 104 drive controls the focus group 501 to a target position via the focus drive unit 502 to correct an out-of-focus object image.

The camera body 1 includes a pitch shake detection unit 19 and a yaw shake detection unit 20 as a shake detection means capable of detecting the image blurring such as hand-induced camera shake caused by the user.

The pitch shake detection unit 19 and the yaw shake detection unit 20 each use an angular velocity sensor (vibrating gyroscope) and an angular acceleration sensor to detect the image blurring in the pitch direction (rotational direction around Z-axis direction) and the yaw direction (rotational direction around Y-axis direction), respectively, to output shake signals.

The camera control unit 12 uses the shake signals from the pitch shake detection unit 19 to calculate a shift position in the Y-axis direction of the image stabilization lens group 301 (shift lens).

Similarly, the camera control unit 12 uses the shake signals from the yaw shake detection unit 20 to calculate a shift position in the Z-axis direction of the image stabilization lens group 301.

The camera control unit 12 drive controls the image stabilization lens group 301 to move to a target position based on the calculated shift position in the pitch direction and/or the yaw direction, and performs an image stabilization operation to reduce the image blurring during light exposure or display of a live view.

The exchangeable lens 101 serving as the lens barrel includes the zoom operation ring 103 that changes an angel of view of the image pickup optical system, and a zoom detection unit 106 that detects an angle of the zoom operation ring 103.

The zoom detection unit 106 detects the angle of the zoom operation ring 103 operated by the user as an absolute value, and is composed of, for example, a resistance linear potentiometer.

Information about the angle of view detected by the zoom detection unit 106 is transmitted to the lens control unit 104 and is reflected in the various control by the camera control unit 12 described above.

Figure 3:
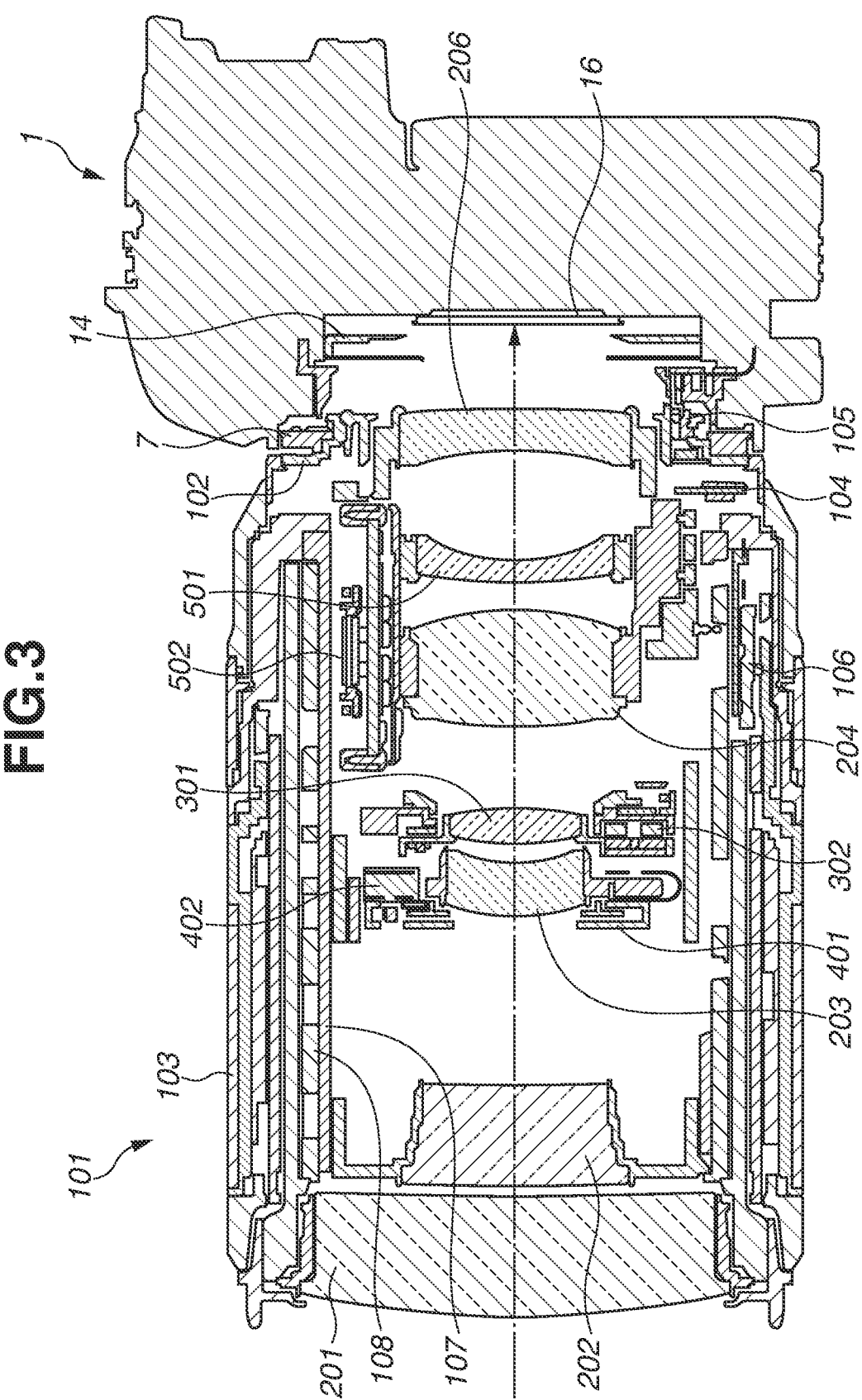
FIG. 3 is a cross-sectional view (retracted state) of the exchangeable lens according to the example embodiment.
Figure 4:
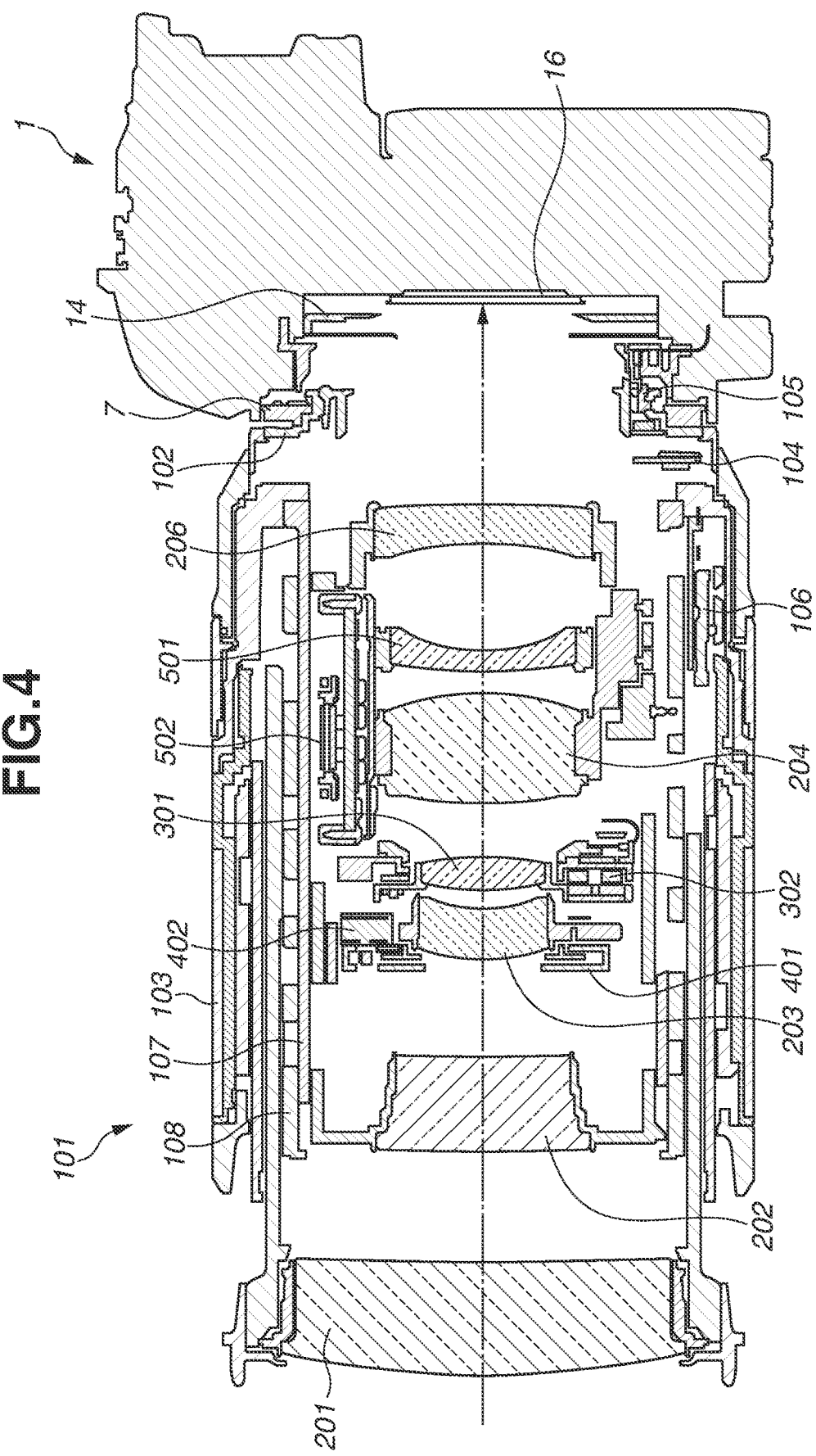
FIG. 4 is a cross-sectional view (extended state) of the exchangeable lens according to the example embodiment.

The following describes a positional relationship of components of the exchangeable lens 101 and the camera body 1 with reference to FIGS. 3 and 4.

FIGS. 3 and 4 are cross-sectional views on an XY plane including the optical axis and illustrate a retracted state and an extended state of the exchangeable lens 101, respectively.

A center line illustrated here substantially coincides with the optical axis determined by the image pickup optical system, and thus is defined as the same as the optical axis in the following.

The present example embodiment employs a six-group configuration as one example of the image pickup optical system.

Each zoom group that has moved to the predetermined optical position based on the angle of view focuses light from the object on an image pickup plane of the image pickup device 16.

At this time, the zoom group 201 described above functions as a first zoom group, the aperture group 401 and the image stabilization lens group 301 as a third zoom group, and the focus group 501 as a fifth zoom group.

The image pickup optical system further includes a second zoom group 202, a third zoom group 203, a fourth zoom group 204, and a sixth zoom group 206.

The present example embodiment does not limit the configuration of the lens groups, and the image stabilization lens group 301 and the focus group 501 may function as the second zoom group, for example.

Alternatively, part of the lens group may be immovable and fixed.

Figure 5:
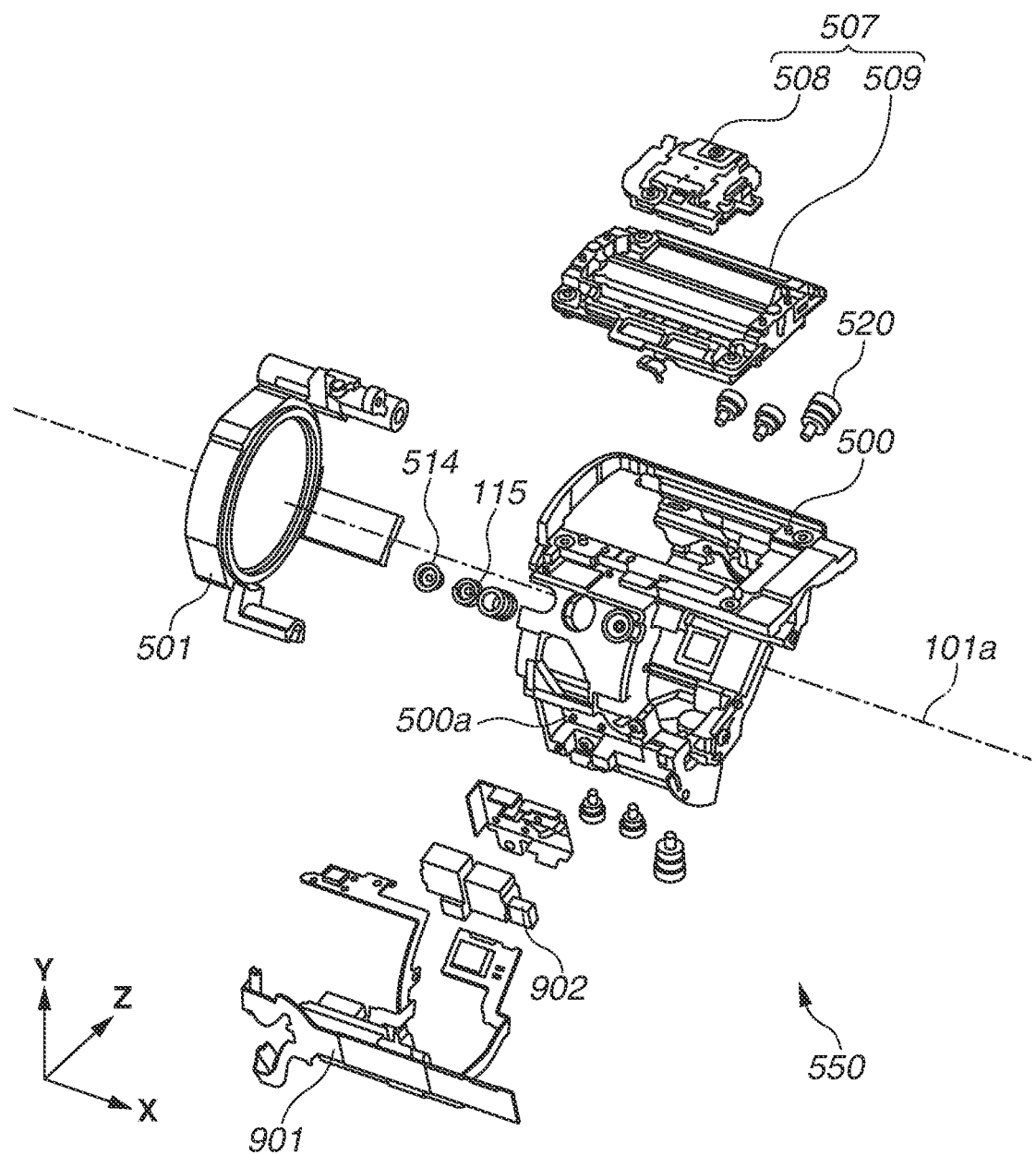
FIG. 5 is an exploded perspective view of a main part of the exchangeable lens according to the example embodiment.

A configuration of a focus group unit 550 will be described below with reference to FIGS. 5, 6, and 7. FIG. 5 is an exploded perspective view of the focus group unit 550, and illustrates the focus group unit 550 viewed from an obliquely front side by disassembling part of components.

Figure 6:
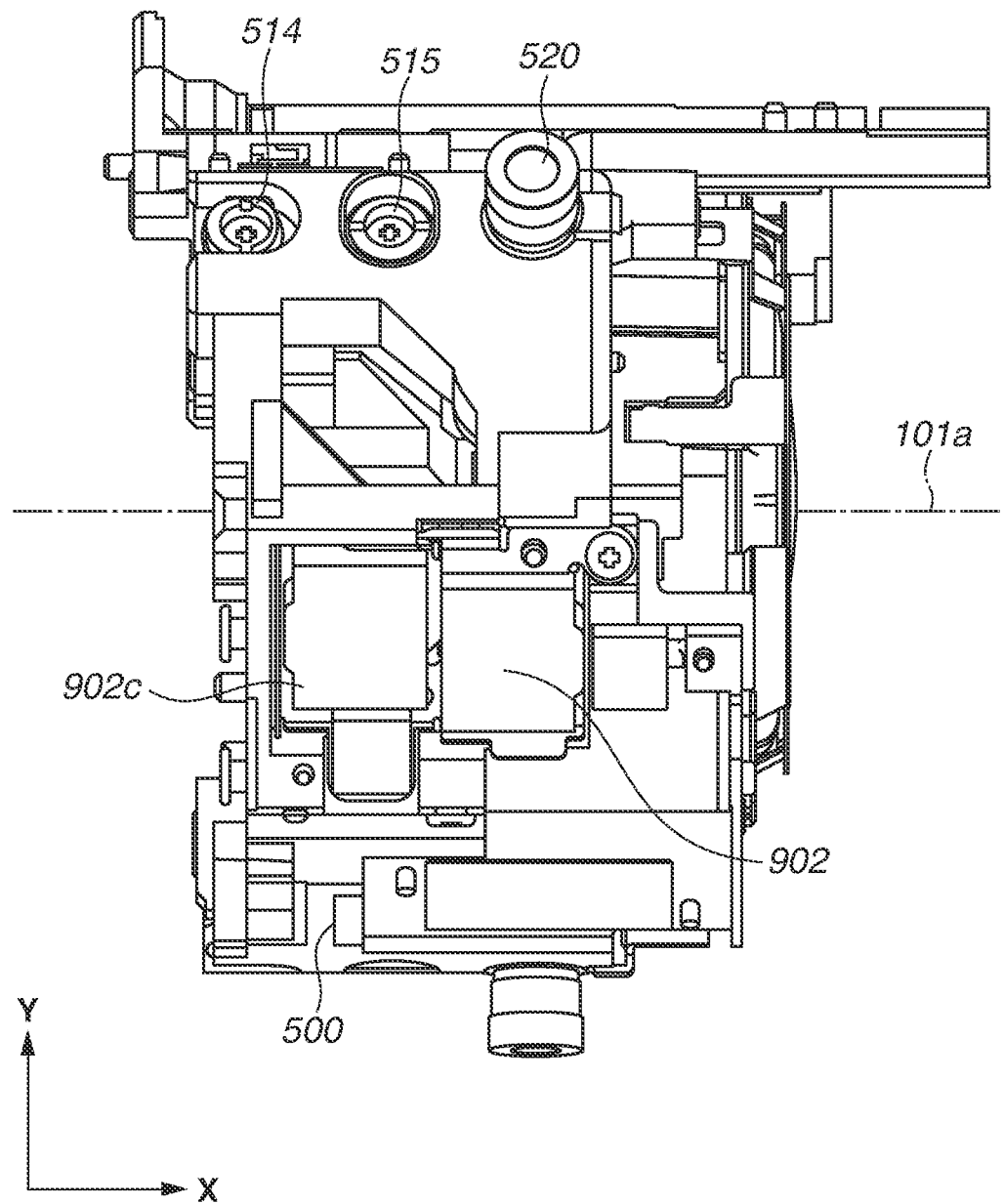
FIG. 6 is a side view of the main part of the exchangeable lens according to the example embodiment.

FIG. 6 is a side view of the focus group unit 550.

The focus group unit 550 includes a barrel 500, and the focus group 501 housed inside the barrel 500.

A direct drive vibration wave motor (hereinafter referred to as vibration wave motor) 507, which is one type of ultrasonic wave motors, is mounted on an upper surface of the barrel 500 as an actuator constituting part of the focus drive unit 502.

The vibration wave motor 507 includes a long axis in the optical axis direction and moves the focus group 501 in the optical axis direction through a connecting member, which is not illustrated, in response to an instruction from the lens control unit 104.

The vibration wave motor 507 includes a movable portion 508 having a vibration element, and a fixed portion 509 having a friction member.

The vibration element includes a vibration plate provided with a frictional contact portion, and a piezoelectric element fixed to a rear surface of the vibration plate with an adhesive or the like.

The vibration plate is pressed to be in contact with the friction member at the frictional contact portion. When a two-phase voltage is applied to the piezoelectric element, vibration (ultrasonic vibration) is caused at a frequency in an ultrasonic range.

As a result, a resonance phenomenon occurs in the vibration element and the vibration element deforms, thereby generating spheroidal motion at the frictional contact portion. In this manner, the lens control unit 104 drives the focus group 501 to the target position.

The focus drive unit 502 generates a driving pulse and performs switching of a circuit by the driving pulse.

A booster transformer 902 is a circuit component that outputs a voltage higher than a voltage applied to the lens control unit 104 and is part of a circuit constituting a power supply for the focus drive unit 502.

The present example embodiment does not intend to limit use of the booster transformer 902, and the booster transformer 902 may be part of a power supply for a stepping motor constituted as one example of an actuator to drive the lens group.

While the present example embodiment employs the booster transformer as the circuit component, the circuit component does not necessarily need to constitute the power supply and is not limited to the booster transformer. When a liquid crystal display or the like is arranged on an exterior surface of the exchangeable lens 101, the present example embodiment may employ a circuit component constituting a power supply for display of the liquid crystal display.

The barrel 500 is arranged on an inner circumference side of a cam barrel 108 and has a substantially cylindrical shape along an internal circle of the cam barrel 108.

The booster transformer 902 is arranged on a side surface 500a of the barrel 500 so as not to project from the barrel 500 toward an outer circumference side.

When supplied with power through a flexible printed wiring board 901 serving as a flexible substrate, the booster transformer 902 produces magnetic flux in a winding axis direction of a coil included therein.

When such magnetic flux is produced in a process of the image pickup device 16 for generating and outputting image pickup signals, the variation may be superimposed on the image pickup signals as magnetic noise, thereby degrading image quality.

More specifically, when magnetic noise reaches the image pickup device 16, a magnetic field passes through a signal line used for extracting pixel charge information the image pickup signals, thereby changing the signal at a high frequency.

Consequently, electromagnetic induction generates magnetism in the signal line, thereby generating noise in the signal line used for pixel charge information.

Figure 7:
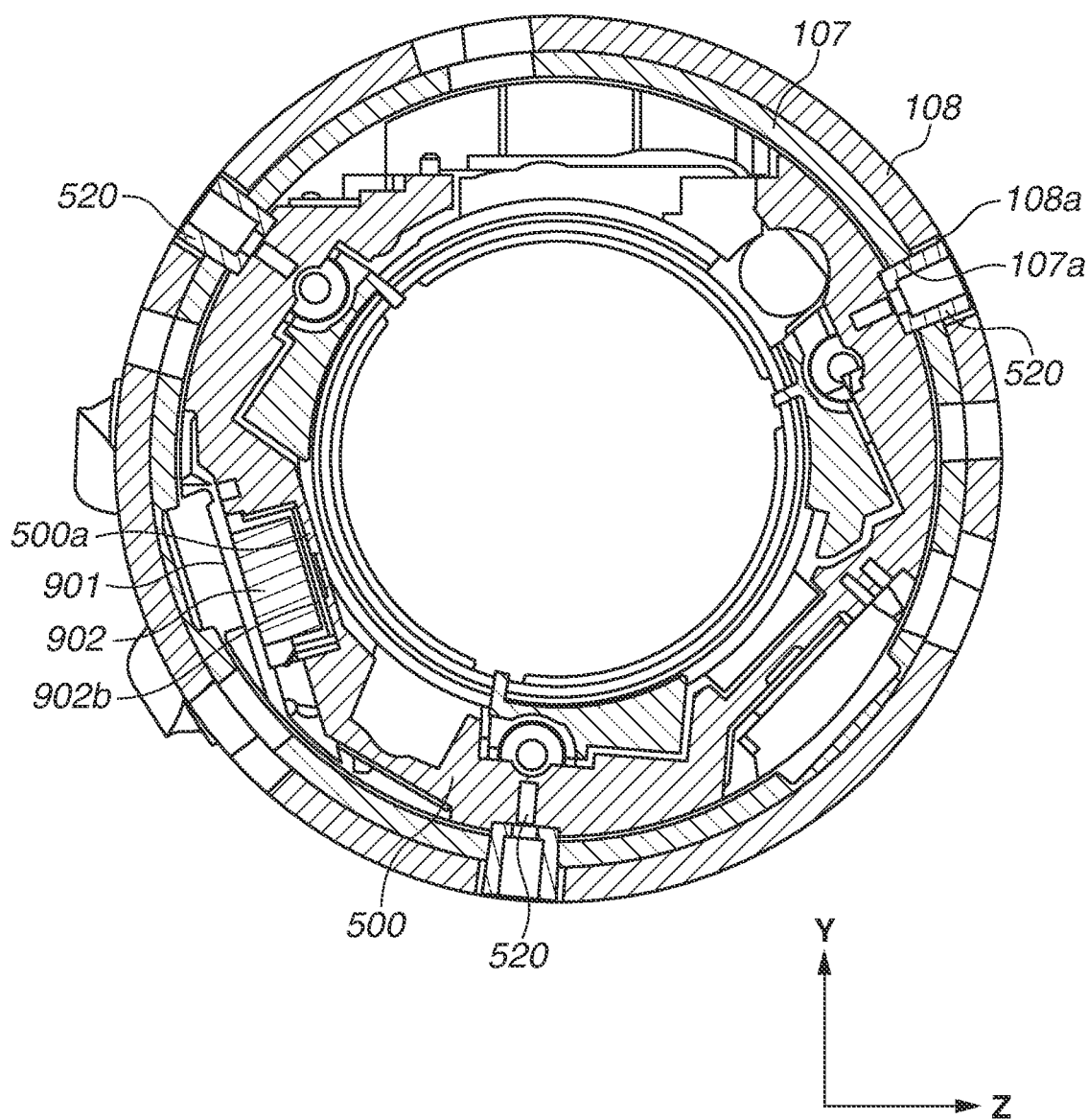
FIG. 7 is a cross-sectional view, which is orthogonal to an optical axis, of the main part of the exchangeable lens according to the example embodiment.

FIG. 7 is a cross-sectional view orthogonal to an optical axis 101a illustrated in FIG. 6. A straight advance guide barrel 107 is a fixed component that is fixed to the lens mount 102 through a fixed barrel, which is not illustrated.

Bayonet claws, which are not illustrated, are arranged on an outer circumferential surface of the straight advance guide barrel 107 at equal intervals. Meanwhile, circumferential grooves, which are not illustrated, are provided on an inner circumferential surface of the cam barrel 108.

Further, the cam barrel 108 is connected to the zoom operation ring 103. The rotating operation of the zoom operation ring 103 rotates the cam barrel 108 around the optical axis through engagement between the bayonet claws and the respective circumferential grooves.

Straight advance guide grooves 107a that restrict movement of the barrel 500 in the rotational direction and guide straight advance of the barrel 500 in the optical axis direction are formed in the straight advance guide barrel 107.

Cam grooves 108a each having an angle in the rotational direction corresponding to the barrel 500 are formed in the cam barrel 108.

Meanwhile, connecting members (hereinafter referred to as cam followers) 520 are equally spaced apart and arranged in a three phases, which are different from the booster transformer 902 and the vibration wave motor 507. The cam followers 520 are engaged with the respective straight advance guide grooves 107a and the respective cam grooves 108a.

By arranging the cam followers 520 in the different phases from the booster transformer 902 and the vibration wave motor 507, the barrel 500 can be downsized in the optical axis direction.

This can downsize the exchangeable lens 101 in the optical axis direction.

The rotating operation of the zoom operation ring 103 by the user rotates the cam barrel 108, and the engagement of the cam followers 520 with the respective straight advance guide grooves 107a and cam grooves 108a extends retracts the barrel 500 in the optical axis direction.

Similarly, mutually different cam followers, which are not illustrated, are provided for the other zoom groups, and engaged with corresponding straight advance guide grooves, and corresponding cam grooves (not illustrated).

Thus, the rotating operation of the zoom operation ring 103 by the user rotates the cam barrel 108, and the engagement of the cam followers with the respective straight advance guide grooves and the respective cam grooves simultaneously extends and retracts each of the zoom groups in the optical axis direction.

The flexible printed wiring board 901 serving as the flexible substrate includes a movable bent portion 907a that extends and retracts the barrel 500 in the optical axis direction and that is held by the straight advance guide barrel 107.

Thus, the movable bent portion 907a held by the straight advance guide barrel 107 can prevent the flexible printed wiring board 901 from interfering with in the driving for advancement and retraction of the barrel 500 in the optical axis direction, or prevent a wire of the flexible printed wiring board 901 from being broken.

Figure 8A:
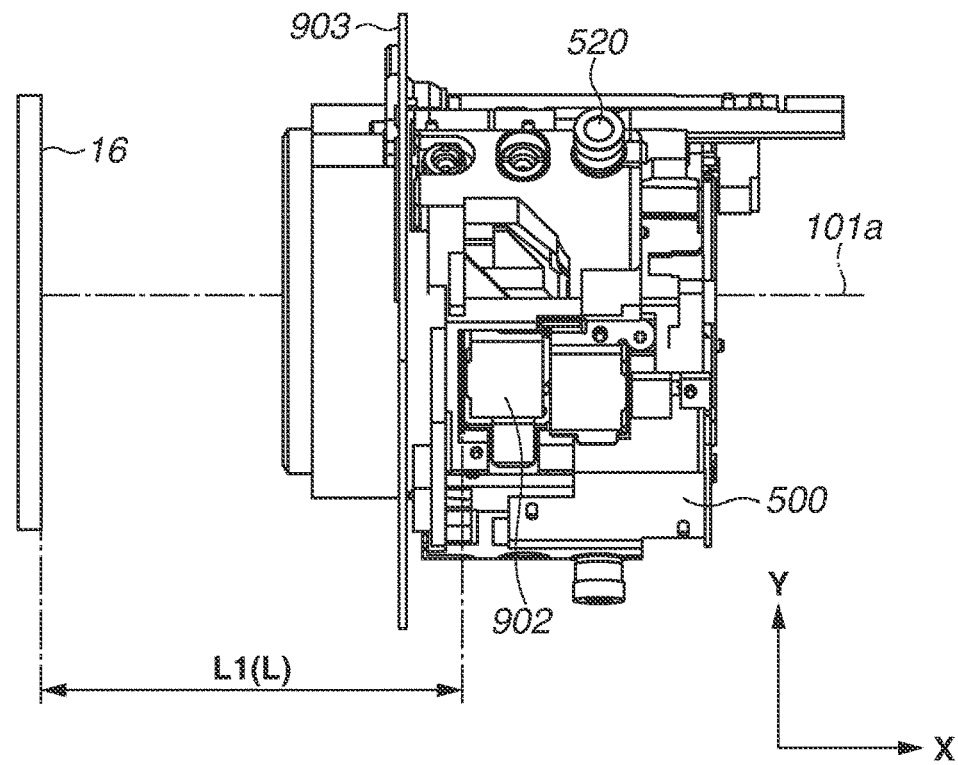
FIG. 8A is a side view of the main part when a zoom position is at a wide-angle end.
Figure 8B:
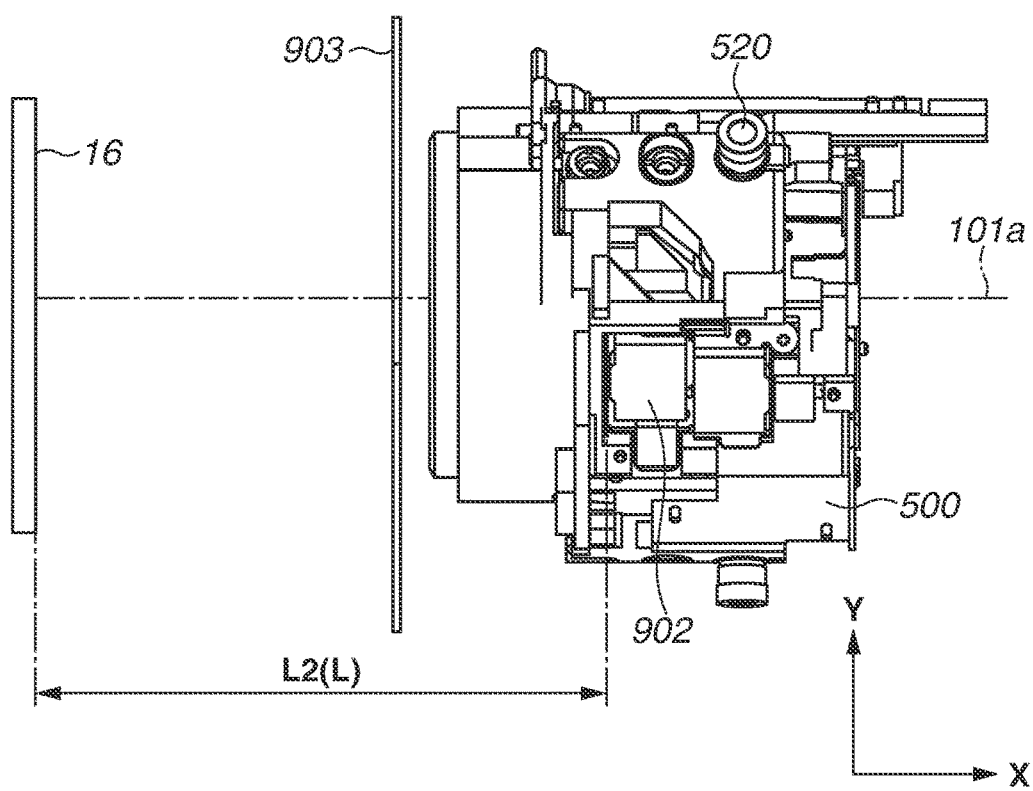
FIG. 8B is a side view of the main part when the zoom position is at a telephoto end.

FIGS. 8A and 8B are side views each illustrating a positional relationship in the optical axis direction between the image pickup device 16 and the booster transformer 902.

FIG. 8A illustrates a state of the exchangeable lens 101 when a zoom position is at a wide-angle end, and FIG. 8B illustrates a state of the exchangeable lens 101 when the zoom position is at a telephoto end.

A first substrate 903 is arranged in substantially parallel to the image pickup device 16. The booster transformer 902 is always arranged closer to the object (on the opposite side of image pickup device 16) than the first substrate 903.

The booster transformer 902 and the image pickup device 16 are arranged to have a large distance L therebetween. Keeping the large distance L between the booster transformer 902 and the image pickup device 16 makes the image pickup device 16 less susceptible to leakage magnetic flux.

As described above, the operation of the zoom operation ring 103 extends and retracts each zoom group in the optical axis direction, thereby varying a focal length.

Further, the rotating operation of the zoom operation ring 103 extends and retracts the barrel 500 in the optical axis direction.

That is, when the booster transformer 902 held by the barrel 500 and the image pickup device 16 have the distance L therebetween, the operation of varying the focal length changes the distance L between the booster transformer 902 and the image pickup device 16.

According to the present example embodiment, particularly when the focal length is in a wide-angle direction, the distance L between the booster transformer 902 and the image pickup device 16 increases as the focal length moves toward a telephoto direction.

This configuration is in consideration of the characteristics of the optical system that an aperture diameter is harder to be maintained as the focal length moves toward the telephoto direction.

That is, a captured image becomes dark in a state where the focal length is in the telephotoside, in which the aperture diameter is hard to be maintained. The camera body 1 complements darkness of the captured image and thus can increase sensitivity of the image pickup device 16.

However, the higher the sensitivity of the image pickup device 16, the more susceptible the image pickup device 16 becomes to leakage magnetic flux produced from the booster transformer 902. Assuming that the length L=L1 when the focal length is at the wide-angle end and the length L=L2 when the focal length is at the telephoto end, the expression L1<L2 holds.

Accordingly, if the distance L between the booster transformer 902 and the image pickup device 16 is increased as the focal length moves toward the telephoto direction, the image pickup device 16 becomes less susceptible to leakage magnetic flux.

Thus, the booster transformer 902 is held by the barrel 500 that extends and retracts in the optical axis direction in accordance with change in the focal length. With this configuration, the image pickup device 16 is less susceptible to leakage magnetic flux even if the sensitivity of the image pickup device 16 is increased to complement a difficulty to maintain the aperture diameter as the focal length moves toward the telephoto direction.

The lens barrel 101 according to the present example embodiment holds the image pickup optical system that forms the object image on the image pickup device 16.

The lens barrel 101 includes the cam barrel 108 capable of rotating around the optical axis 101a of the image pickup optical system for driving the zoom lenses 202, 201, and 203.

Further, the lens barrel 101 includes the barrel 500 that holds the zoom lenses, that is cam-engaged with the cam barrel 108, and that is arranged on the inner circumference side of the cam barrel 108.

Further, the lens barrel 101 includes the circuit component (booster transformer) 902 arranged on the inner circumference side of the cam barrel 108 and constituting the power supply for the actuator 507.

The circuit component (booster transformer) 902 is arranged on the side surface 500a of the barrel 500.

The circuit component (booster transformer) 902 is characterized by moving in the optical axis direction together with the barrel 500 in accordance with the rotation of the cam barrel 108.

The distance L in the optical axis direction between the circuit component 902 and the image pickup device 16 increases as the focal length of the image pickup optical system moves toward the telephoto direction.

The distance L in the optical axis direction between the circuit component 902 and the image pickup device 16 increases as the focal length of the image pickup optical system increases.

The lens barrel 101 includes: the guide barrel 107 that is arranged between the cam barrel 108 and the barrel 500 and that inhibits the rotation of the zoom lenses to move the zoom lenses in the optical axis direction; and the flexible substrate 901 electrically connected to the circuit component 902 and having the movable bent portion 907a.

The movable bent portion 907a serving as an overlaid portion that is overlaid with wiring is arranged between the barrel 500 and the guide barrel 107 in a radial direction of the lens barrel.

The cam barrel 108 includes the cam pin 520 that connects the cam barrel 108 and the barrel 500 to each other, and the circuit component 902 is arranged out of phase with the cam pin 520 in the circumferential direction of the lens barrel.

At least part of the circuit component 902 is always arranged on the inner circumference side of the cam barrel 108 within a range in which the circuit component 902 extends and retracts in the optical axis direction.

The circuit component 902 constitutes a power supply for the ultrasonic wave motor 507 serving as the vibration wave motor.

The lens barrel 101 is the exchangeable lens that includes the image pickup device 16 and that can be inserted into and removed from the camera body.

The lens barrel 101 includes: a lens side terminal that is electrically connected to a camera side terminal arranged on the camera body for supplying a voltage to the lens barrel; and the first substrate 903 on which a connector portion electrically connected to one end of the lens side terminal is mounted.

The lens barrel 101 includes the first substrate 903 that is arranged closer to the object in the optical axis direction than the mount portion of the lens barrel 101.

When the circuit component 902 is positioned the closest to an image plane in the optical axis direction, the circuit component 902 is positioned closer to the object than the first substrate 903.

A relation between the focus group unit 550 and the flexible printed wiring board 901 will be described below with reference to FIGS. 9A and 9B.

Figure 9A:
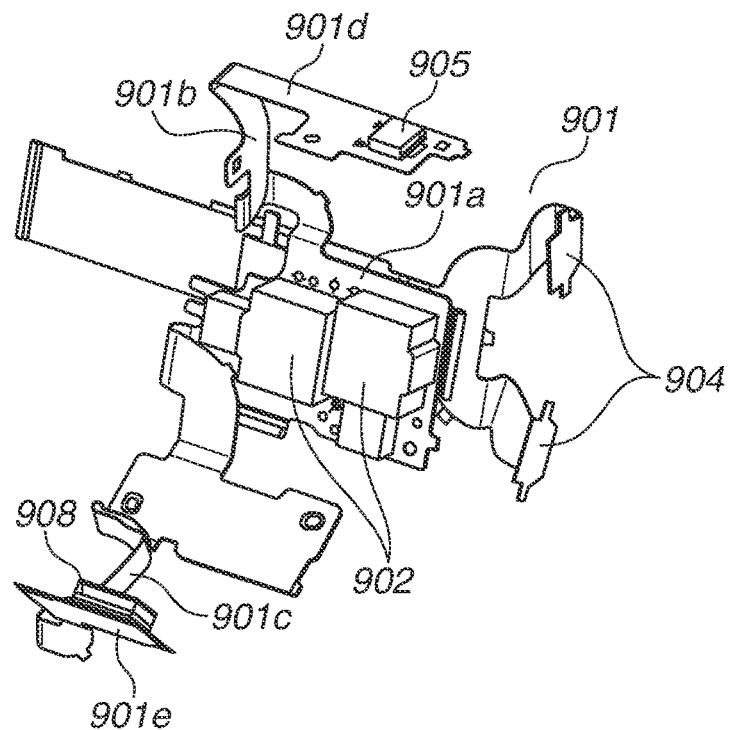
FIGS. 9A and 9B are perspective views for explaining a flexible printed wiring board according to the present example embodiment.

FIG. 9A is a perspective view for explaining an example embodiment of the flexible printed wiring board 901. The flexible printed wiring board 901 includes a mount portion 901a, on which the booster transformer 902 constituting the power supply for the vibration wave motor 507 is mounted.

The flexible printed wiring board 901 serving as the flexible substrate includes, as part thereof, portions 904 to be connected to the first substrate 903.

The flexible printed wiring board 901 serving as the flexible substrate includes, at one end thereof, a part 901d provided with a connection portion 905.

Part of the flexible printed wiring board 901 from the mount portion 901a to the part 901d provided with the connection portion 905 is integrally formed by a wiring portion 901b.

The flexible printed wiring board 901 includes a mount portion 901e at the other end thereof different from the one end provided with the part 901d.

A non-contact position detection sensor 908 is mounted on the mount portion 901e. The position detection sensor 908 is a non-contact detection sensor for detecting position of the focus group 501 to calculate a focus driving amount.

Part of the flexible printed wiring board 901 from the mount portion 901a to the mount portion 901e, on which the position detection sensor 908 is mounted, is integrally formed by a wiring portion 901c. The booster transformer 902 is provided between the part 901d and the mount portion 901e and is integral by the wiring portion 901b and by the wiring portion 901c.

Figure 11:
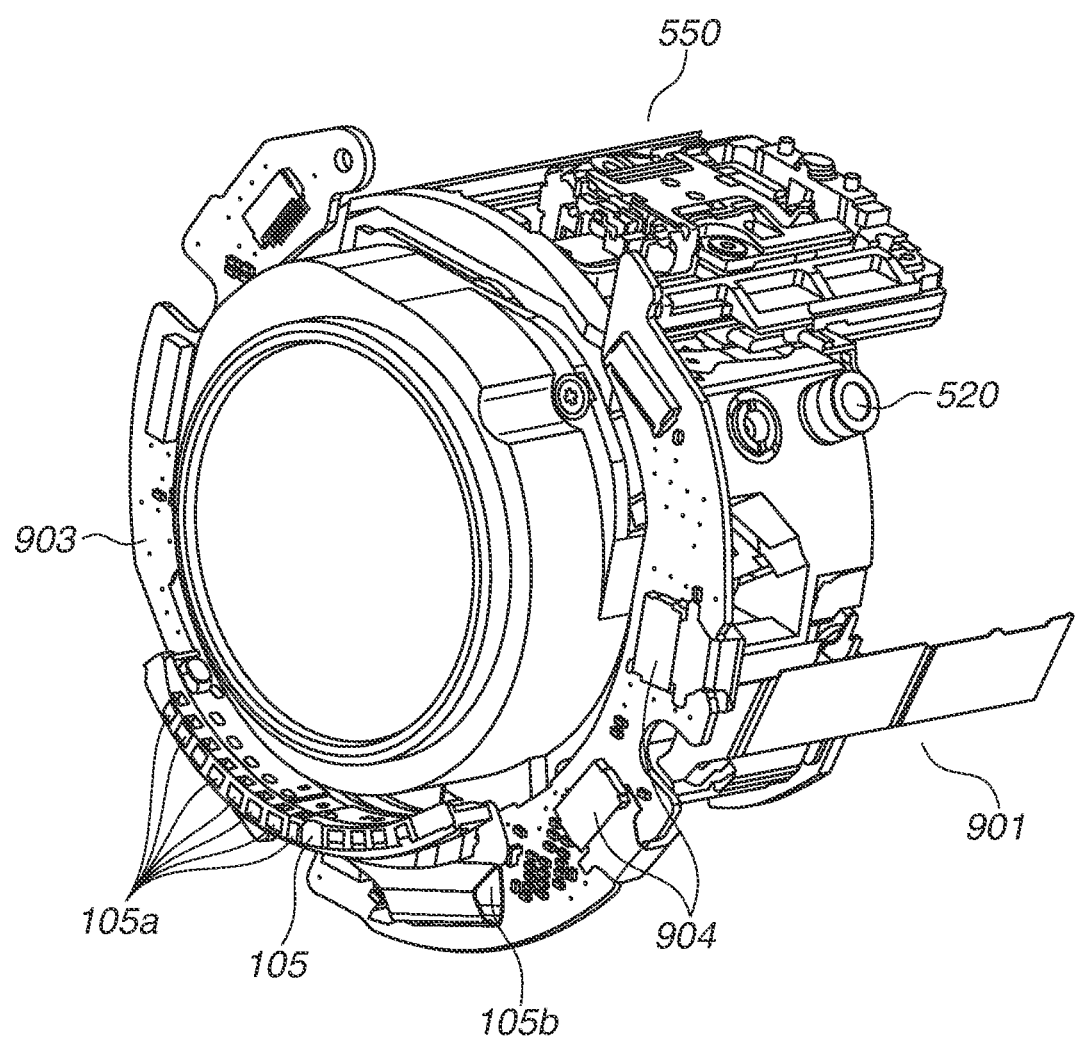
FIG. 11 is a perspective view for explaining the flexible print circuit board according to the present example embodiment.

FIG. 11 is a perspective view of the focus group unit 550 when viewed from the first substrate 903 side.

The connection portions 904 of the flexible printed wiring board 901 are connected to the first substrate 903.

The electric contact 105 is, at one end thereof, electrically connected to the first substrate 903 by a connector portion 105b. As illustrated in FIG. 2, the electric contact 105 supplies power from the power supply unit 10 of the camera body 1 to the exchangeable lens 101 through terminals 105a.

That is, power supplied from the camera body 1 goes through the connection portions 904 provided in the first substrate 903 and the flexible printed wiring board 901 and is output as an appropriate voltage by the booster transformer 902.

Figure 9B:
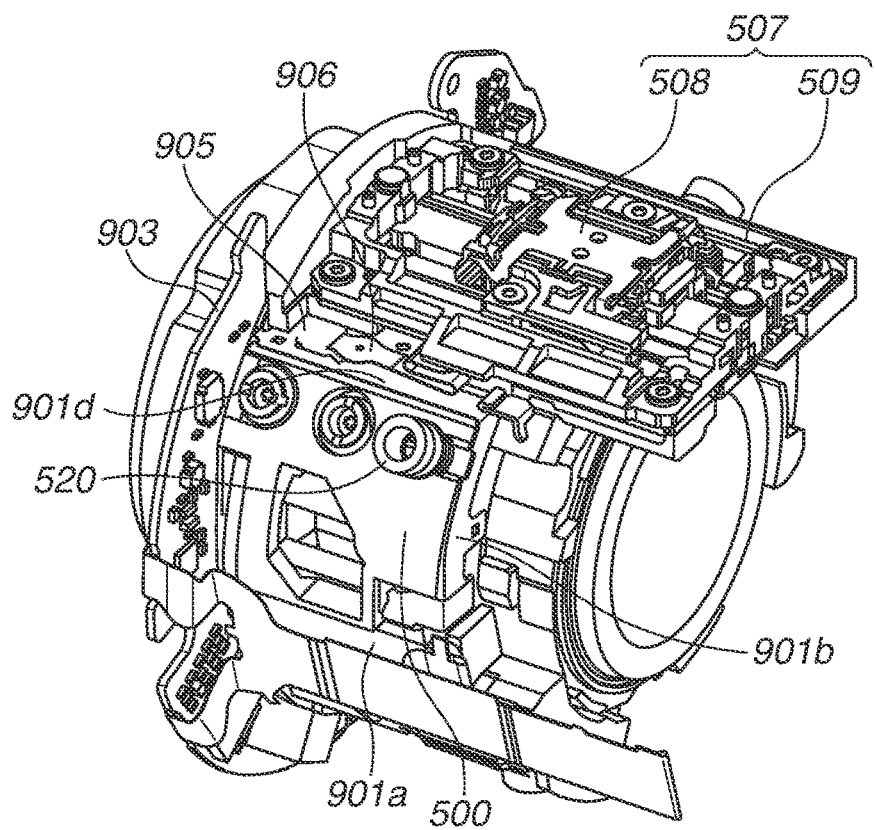

FIG. 9B is a perspective view for explaining a relation between the focus group unit 550 and the flexible printed wiring board 901.

The vibration wave motor 507 includes a second substrate 906 required for driving. The flexible printed wiring board 901 is provided outside the focus group unit 550.

As illustrated in FIGS. 8A and 8B, a main plane of the first substrate 903 is arranged in parallel to the image pickup device 16.

The connection portion 905 provided in the part 901d of the flexible printed wiring board 901 is used for connection to the second substrate 906.

The wiring portion 901b used for connection in the flexible printed wiring board 901 from the mount portion 901a to the part 901d is arranged substantially in parallel to the image pickup device 16 illustrated in FIGS. 8A and 8B and on the object side of the barrel 500 (on the opposite side of the image pickup device 16).

The wiring portion 901b is arranged in the same phase as the cam follower (cam pin) 520. The flexible printed wiring board 901 is integrally arranged outside the focus group unit 550 while circumventing the cam follower (cam pin) 520.

Since the wiring portion 901b is arranged on the object side of the barrel 500 (on the opposite side of the image pickup device 16), the image pickup device 16 becomes less susceptible to leakage magnetic flux.

Figure 10A:
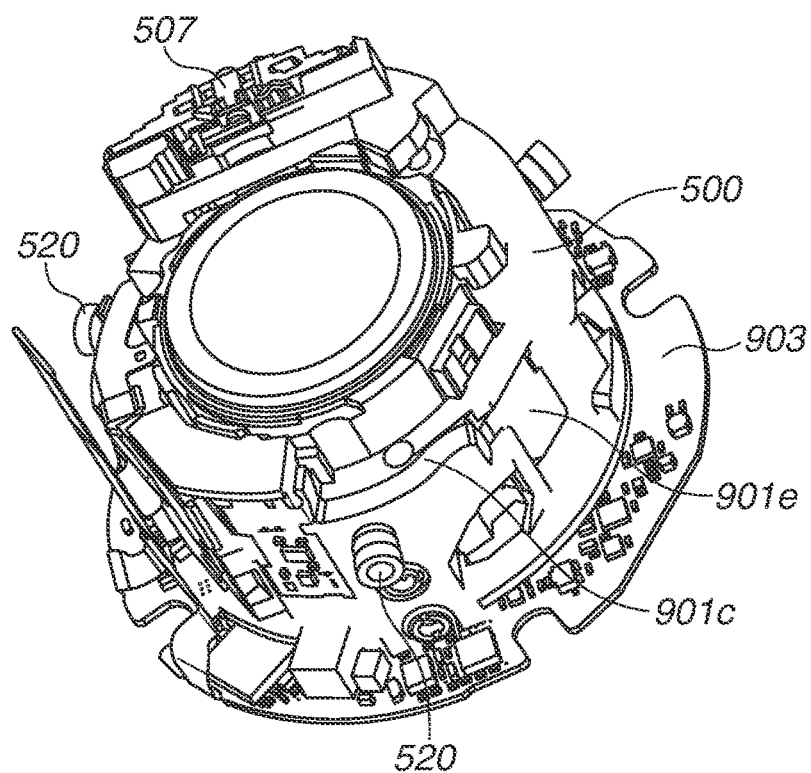
FIGS. 10A and 10B are perspective views for explaining the flexible print circuit board according to the present example embodiment.

FIG. 10A is a perspective view when viewed in an angle different from an angle in FIG. 9A. The wiring portion 901c is used to connect the flexible printed wiring board 901 from the mount portion 901a to the mount portion 901e, on which the position detection sensor 908 is mounted.

The wiring portion 901c is arranged substantially in parallel to the image pickup device 16 illustrated in FIGS. 8A and 8B and on the object side of the barrel 500 (on the opposite side of the image pickup device 16).

The wiring portion 901c is arranged in the same phase as the cam follower (cam pin) 520. Thus, the flexible printed wiring board 901 is integrally arranged outside the focus group unit 550 while circumventing the cam follower 520.

Figure 10B:
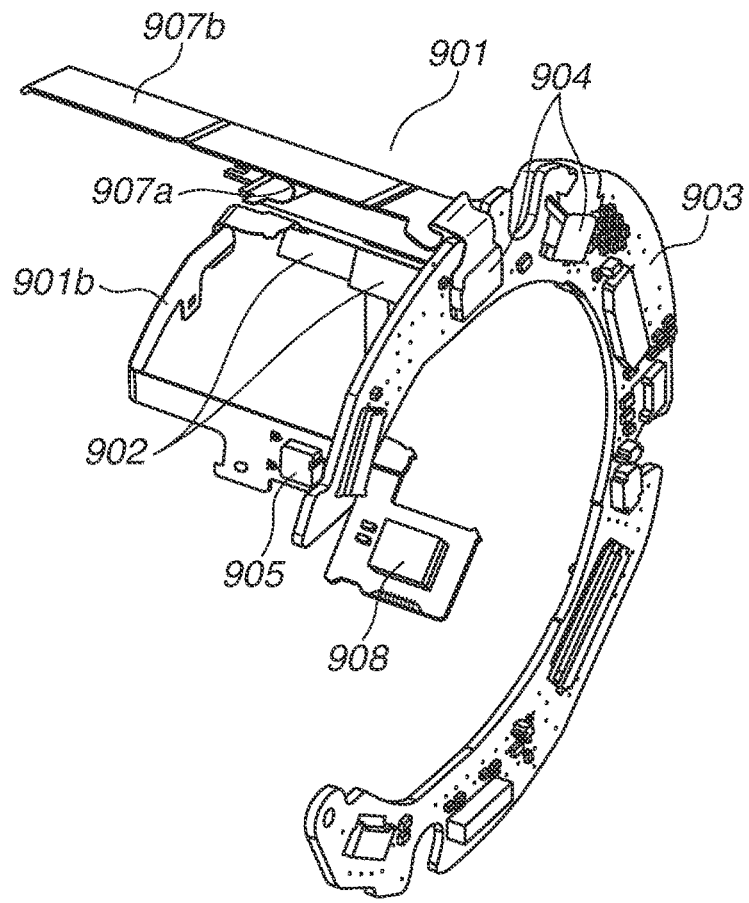

FIG. 10B is a perspective view for explaining a relation between the first substrate 903 and the flexible printed wiring board 901. The main surface of the first substrate 903 is arranged substantially in parallel to the image pickup device 16 illustrated in FIGS. 8A and 8B.

The flexible printed wiring board 901 includes, as part thereof, the portions 904 to be connected to the first substrate 903.

The flexible printed wiring board 901 includes the movable bent portion 907a between the connection portions 904 and the mount portion of the booster transformer 902 constituting the power supply for the vibration wave motor 507 with a stretched portion 907b interposed therebetween.

As illustrated in FIG. 7, with the rotation of the cam barrel 108 and the cam follower (cam pin) 520 engaging with the straight advance guide groove 107a and the cam groove 108a, the barrel 500 extends and retracts in the optical axis direction.

Thus, the flexible printed wiring board 901 allows the barrel 500 to extend and retract in the optical axis direction by moving the movable bent portion 907a with respect to the connection portions 904 and changing an excessive length of the stretched portion 907b. The connection portion 905 is used for connection to the second substrate 906.

Figure 12A:
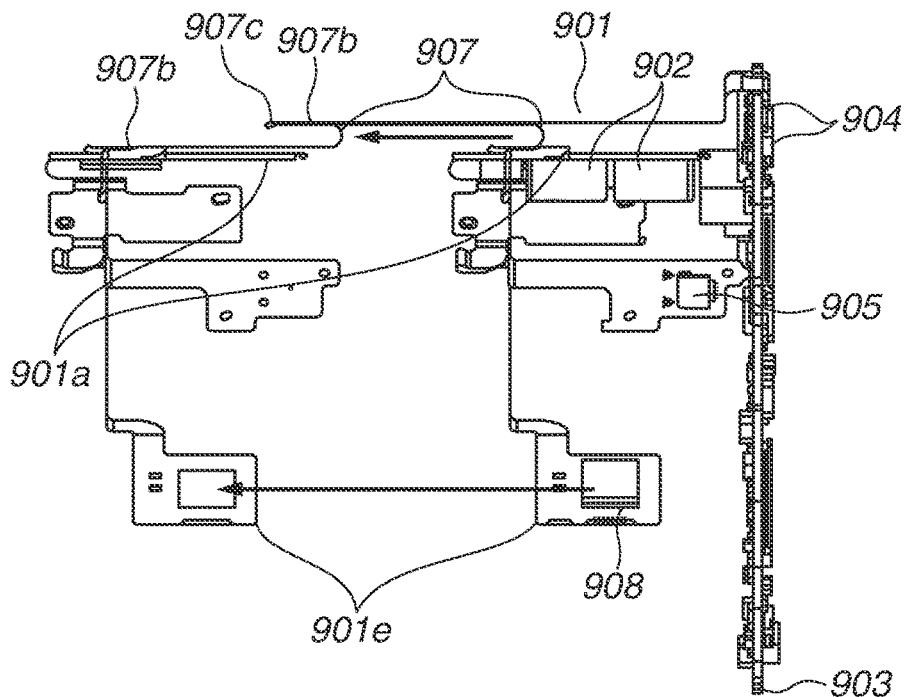
FIGS. 12A and 12B are perspective views for explaining the flexible print circuit board according to the present example embodiment.
Figure 12B:
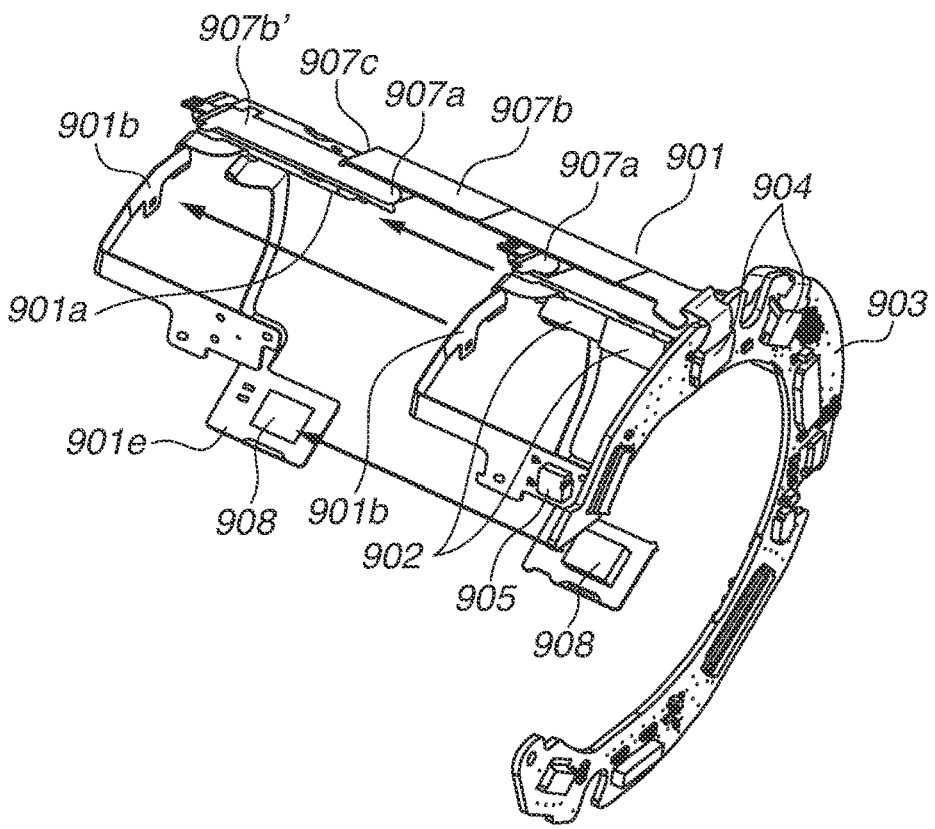

FIGS. 12A and 12B are diagrams for explaining the movement of the movable bent portion 907a when the barrel 500 moves toward the object side in the optical axis direction indicated by an arrow.

FIG. 12A is a diagram when viewed from a cross-sectional direction of the flexible printed wiring board 901. When the barrel 500 moves toward the object side in the optical axis direction, the movable bent portion 907a also moves toward the object side.

At this time, a part 907c is held by a member different from the barrel 500. As illustrated in FIG. 12B, the movement of the movable bent portion 907a lengthens the stretched portion 907b on a side 907b' in a state where the part 907c is restrained.

The movable bent portion 907a is an overlaid portion, in which wiring is overlaid in the optical axis direction.

Thus, when the barrel 500 is moved toward the object side in the optical axis direction indicated by the arrow moves, for example, the mount portion 901a of the booster transformer 902 and the mount portion 901e, on which the position detection sensor 908 is mounted, are moved toward the object side in the axis direction together with the barrel 500.

Thus, circuit connection from the first substrate 903 to the second substrate 906 is established.

Since the movable bent portion 907a and the stretched portion 907b are provided to extend and retract the barrel 500 in the optical axis direction, with respect to a wiring length to the connection portions 904, a wiring length to the portion 905 connecting with the second substrate 906 becomes shorter.

That is, the wiring length from the vibration wave motor 507 to the booster transformer 902 constituting the power supply for driving the vibration wave motor 507 can be wired at the shortest distance.

In this manner, the part of the flexible printed wiring board 901 for circumventing the cam follower 520 is arranged by using the wiring portion 901b and the wiring portion 901c on the object side of the barrel 500 (on the opposite side of the image pickup device 16), so that the image pickup device 16 becomes less susceptible to leakage magnetic flux.

By Integrally arranging the flexible printed wiring board 901 with the barrel 500, the most appropriate shape is formed for the configuration of the focus group unit 550 illustrated in FIG. 5.

While the suitable example embodiment of the present disclosure has been described, the present disclosure is not limited to the example embodiment, and various modifications and changes can be made without departing from the gist of the present disclosure.

According to the present example embodiment, the circuit component constituting the power supply for driving the actuator can be arranged on the side surface of the barrel on the inner circumference of the cam barrel. As a result, downsizing of the lens mount can be achieved.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2019-041913, filed Mar. 7, 2019, which is hereby incorporated by reference herein in its entirety.

What is claimed is:

1. An exchangeable lens that can be inserted into and removed from a camera body including an image pickup device,
wherein the exchangeable lens comprises:
an image pickup optical system configured to form an object image on the image pickup device;
a cam barrel configured to rotate around an optical axis of the image pickup optical system for driving a first lens that constitutes the image pickup optical system;
a barrel that is configured to hold the first lens and to be cam-engaged with the cam barrel, and that is arranged on an inner circumference side of the cam barrel;
a circuit component that is arranged on the inner circumference side of the cam barrel and constitutes a power supply for an ultrasonic wave motor;
a flexible printed wiring board on which the circuit component are mounted;
a lens side terminal that is electrically connected to a camera side terminal arranged on the camera body to supply a voltage to a lens barrel; and
a first substrate, on which a connector portion electrically connected to one end of the lens side terminal is mounted,
wherein the first substrate is arranged closer to an object in the optical axis direction than a mount portion of the exchangeable lens, and
wherein the flexible printed wiring board is electrically connected to the first substrate via a stretched portion constituting the flexible printed wiring board,
wherein the circuit component is arranged on a side surface of the barrel,
wherein the circuit component is configured to move in a direction of the optical axis together with the barrel in accordance with the rotation of the cam barrel,
wherein, when the circuit component is positioned the closest to an image plane in the optical axis direction, the circuit component is positioned closer to the object than the first substrate, and
wherein, when the circuit component is positioned the closest to the image plane in the optical axis direction, the stretched portion is positioned closer to the image plane than the first substrate.

2. The exchangeable lens according to claim 1, wherein, as a focal length of the image pickup optical system moves toward a telephoto direction, a distance in the optical axis direction between the circuit component and the image pickup device increases.

3. The exchangeable lens according to claim 1, further comprising:
   a guide barrel that is arranged between the cam barrel and the barrel, and that is configured to inhibit rotation of the first lens in order to move the first lens in the optical axis direction; and
   a flexible substrate that includes an overlaid portion electrically connected to the circuit component and overlaid with wiring,
   wherein the overlaid portion is arranged between the barrel and the guide barrel in a radial direction of the lens barrel.

4. The exchangeable lens according to claim 1,
   further comprising a cam pin configured to connect the cam barrel and the barrel to each other,
   wherein the circuit component is arranged in a phase differing from the cam pin in a circumferential direction of the lens barrel.

5. The exchangeable lens according to claim 1,
   wherein the actuator is configured to drive a second lens in the optical axis direction, and
   wherein the second lens is a focus lens, and the first lens is a zoom lens.

6. The exchangeable lens according to claim 1,
   wherein at least part of the circuit component is always arranged on the inner circumference side of the cam barrel within a range in which the circuit component extends and retracts in the optical axis direction.

7. The exchangeable lens according to claim 1, wherein, as a focal length of the image pickup optical system increases, a distance in the optical axis direction between the circuit component and the image pickup device increases.

* * * * *